July 25, 1944.   D. E. GILLUM ET AL   2,354,255
CHECK VALVE
Filed Sept. 22, 1942

INVENTORS.
DONALD E. GILLUM.
DALE H. VAN RIPER.
BY
ATTORNEY.

Patented July 25, 1944

2,354,255

UNITED STATES PATENT OFFICE 2,354,255

CHECK VALVE

Donald E. Gillum and Dale H. Van Riper, Los Angeles, Calif.

Application September 22, 1942, Serial No. 459,232

1 Claim. (Cl. 251—121)

This invention relates to a check valve particularly applicable for use on aircraft as well as other places where weight is an important item, and also where a sure operating and inexpensive valve is desired.

An object of our invention is to provide a check valve which is light in weight, inexpensive to manufacture and one which will not leak under usual pressure.

Another object of our invention is to provide a check valve including a check ball of deformable material, the ball having a thin wall section.

A feature of our invention resides in the construction and arrangement of the ribs in the body which reinforce said body as well as to guide the check ball. Furthermore the ribs permit the free passage of fluid and also prevent locking of the check ball in open position.

A further feature of our invention is to provide a check ball in which the inertia of the ball is reduced to a minimum.

Other objects, advantages, and features of invention may appear from the accompanying drawing, the subjoined detailed description, and the appended claim.

Figure 1:
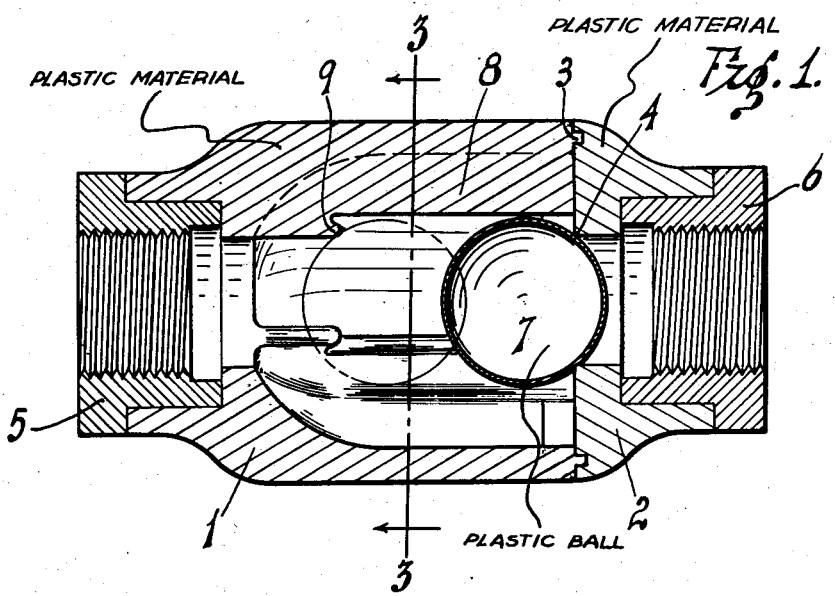
Figure 1 is a longitudinal sectional view of our check valve.
Figure 2:
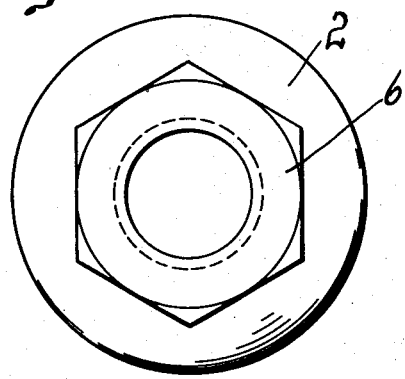
Figure 2 is an end view of the same.
Figure 3:
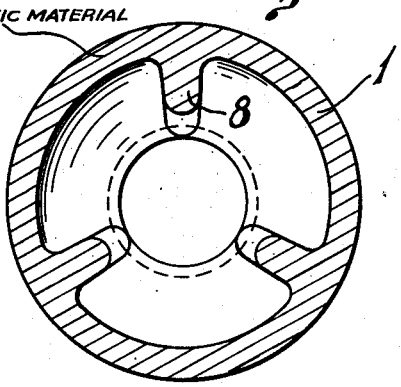
Figure 3 is a sectional view taken on line 3—3 of Figure 1.
Figure 4:
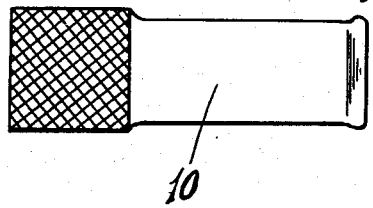
Figure 4 is a side elevation of a hose fitting.

Referring more particularly to the drawing, the numeral 1 indicates an elongated hollow body made of a plastic material and, therefore, can be molded accurately in its final form. A cap 2 closes the intake end of the body 1, and this cap is also formed of the same or similar plastic material. A tongue and groove joint 3 is formed between the body and the cap, and this joint is cemented, thus effectively eliminating the possibility of leakage at this point. An annular seat 4 is integrally formed with the cap 2, and this seat is sharp, thus preventing particles from settling thereon and holding the check ball from properly seating.

A threaded metal ferrule 5 is fixedly mounted at the discharge end of the body 1, and the discharge line (not shown) screws into this ferrule. A second ferrule 6 is fixedly mounted in the cap 2, and the intake pipe (not shown) screws into this last-named ferrule. The ferrules 5 and 6 are molded in the body and in the cap in the well-known manner of mounting metal parts in a plastic device. The ferrules 5 and 6 may be replaced by the hose fitting 10, if desired.

A check ball 7 is mounted within the body 1 and rests against the seat 4 in the closed position. This ball is made of a plastic material and has a thin wall section. A ping pong ball is a good example of this construction. The plastic material of which the ball is made is thus deformable and will accurately seat against the part 4 when under pressure. Also this deformable feature of the ball will enable it to properly seat, even though some slight foreign substance might lodge on the seat 4. The ball 7 is guided in its movement by a plurality of ribs 8 which are integrally cast with the body 1. These ribs reinforce the body and also act as guides for the ball in its movement from open to closed position. The spaced ribs 8 also permit a free flow of the fluid through the check valve. At the rear end, the ribs 8 are formed with a rounded lip or nubbin 9 against which the ball 7 rests in open position. These ribs thus prevent the ball from sticking in open position and also provide a recess to receive a coil spring in event that it is desirable to spring press the ball 7. The fitting 10 may be of the type which can be molded in the body 1, or cap 2, or it may be threaded so as to screw into the ferrules 5 or 6. Also the shape of the fitting 10 may be varied, that is, it may be either straight or angular.

Having described our invention, we claim:

A check valve comprising a hollow body formed of plastic material and having a neck at one end formed with a bore having a reduced inner end portion, the other end of said body forming a flat, annular surface having an annular rib projecting therefrom longitudinally of the body, ribs extending longitudinally in said body along the walls thereof in circumferentially spaced relation to each other and terminating flush with the flat, annular end of said body, said longitudinal ribs having their other end portions of increased depth to provide portions having edges flush with the reduced inner portion of said bore and terminating in nubbins projecting towards the flat, annular end of the body in spaced relation to the free edges of the ribs, a cap of plastic material cemented against the flat, annular end of said body and formed with an annular groove snugly receiving said annular rib, said cap being formed with a bore having an inner end portion of reduced diameter spaced from the free edges of the ribs and sharpened about its inner end to form a valve seat, a hollow valve ball in said body having thin walls and formed of resilient plastic material, said ribs guiding movement of the valve ball through the body between the nubbins and said valve seat, and threaded pipe-receiving ferrules mounted in the bores of the neck and the cap.

DONALD E. GILLUM.
DALE H. VAN RIPER.